(12) United States Patent
Hidehira et al.

(10) Patent No.: US 10,544,322 B2
(45) Date of Patent: Jan. 28, 2020

(54) METHOD OF PREPARING INK JET RESIN COMPOSITION

(71) Applicant: MICROCRAFT KOREA CO., LTD., Gyeonggi-do (KR)

(72) Inventors: Yorio Hidehira, Okayama (JP); Sung Ho Choi, Gyeonggi-do (KR); Dong Heun Shin, Incheon (KR)

(73) Assignee: Microcraft Korea Co., Ltd., Gyeonggi-do (KR)

(*) Notice: Subject to any disclaimer, the term of this patent is extended or adjusted under 35 U.S.C. 154(b) by 0 days.

(21) Appl. No.: 16/301,774

(22) PCT Filed: May 16, 2017

(86) PCT No.: PCT/KR2017/005070
§ 371 (c)(1),
(2) Date: Nov. 15, 2018

(87) PCT Pub. No.: WO2017/200272
PCT Pub. Date: Nov. 23, 2017

(65) Prior Publication Data
US 2019/0153254 A1    May 23, 2019

(30) Foreign Application Priority Data

May 17, 2016 (KR) .................. 10-2016-0060116

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/54* | (2014.01) | |
| *C09D 11/322* | (2014.01) | |
| *C09D 11/326* | (2014.01) | |
| *C09D 11/38* | (2014.01) | |
| *C09D 11/30* | (2014.01) | |
| *C08G 59/50* | (2006.01) | |
| *C08K 5/00* | (2006.01) | |
| *C08K 5/11* | (2006.01) | |
| *C08K 5/45* | (2006.01) | |
| *C08K 5/5397* | (2006.01) | |

(52) U.S. Cl.
CPC .............. *C09D 11/54* (2013.01); *C09D 11/30* (2013.01); *C09D 11/322* (2013.01); *C09D 11/326* (2013.01); *C09D 11/38* (2013.01); *C08G 59/5033* (2013.01); *C08K 5/0041* (2013.01); *C08K 5/11* (2013.01); *C08K 5/45* (2013.01); *C08K 5/5397* (2013.01)

(58) Field of Classification Search
CPC ....... C09D 11/54; C09D 11/322; C09D 11/38; C09D 11/326; C09D 11/30; C08G 59/5033; C08K 5/11; C08K 5/45; C08K 5/0041; C08K 5/5397
USPC .................. 522/7, 6, 71, 189, 184, 1; 520/1
See application file for complete search history.

(56) References Cited

U.S. PATENT DOCUMENTS

| | | |
|---|---|---|
| 2003/0215746 A1 | 11/2003 | Kohiyama et al. |
| 2012/0270018 A1 | 10/2012 | Mizutani et al. |
| 2018/0371276 A1* | 12/2018 | Miyano ............... B41J 2/01 |

FOREIGN PATENT DOCUMENTS

| | | | |
|---|---|---|---|
| JP | H7-263845 A | | 10/1995 |
| JP | 3964326 B2 | | 8/2007 |
| KR | 10-2002-0016504 A | | 3/2002 |
| KR | 1020020016504 | * | 3/2002 |
| KR | 10-2011-0120211 A | | 11/2011 |
| KR | 1020110120211 | * | 11/2011 |
| KR | 10-2012-0062677 A | | 6/2012 |
| KR | 10-1526678 B1 | | 6/2015 |

OTHER PUBLICATIONS

Kang, KR 1020020016504 Machine Translation, Mar. 4, 2002 (Year: 2002).*
Katsyuki et al, KR 1020110120211 Machine Translation, Nov. 3, 2011 (Year: 2011).*

* cited by examiner

*Primary Examiner* — Jessica Whiteley
(74) *Attorney, Agent, or Firm* — Hoffmann & Baron, LLP

(57) ABSTRACT

The present invention provides a method of preparing an ink jet resin composition including preparing a liquid (a) including a thermosetting epoxy resin and a first non-volatile acryl compound, preparing a liquid (b) including a pigment and a second non-volatile acryl compound, preparing a liquid (c) including a photoinitiator and a third non-volatile acryl compound, and mixing the liquids (a), (b) and (c) and further including an amine synergist and a viscosity controlling agent to prepare a resin composition. According to the method of preparing an ink jet resin composition of the present invention, an ink jet resin composition may be easily prepared without using a volatile solvent but using acryl compounds as diluents, and the resin composition prepared thereby may have improved heat resistance, chemical resistance and adhesion.

15 Claims, 2 Drawing Sheets

METHOD OF PREPARING INK JET RESIN COMPOSITION

CROSS-REFERENCE TO RELATED APPLICATIONS

This application is the National Stage of International Application No. PCT/KR2017/005070, filed May 16, 2017, which claims the benefit of Korean Application No. KR 10-2016-0060116, filed May 17, 2016, the contents of which is incorporated by reference herein.

FIELD OF THE INVENTION

The present invention relates to a method of preparing an ink jet resin composition.

DESCRIPTION OF THE RELATED ART

Recently, as a method for protecting a conductor circuit formed on a wiring board such as a printed wiring board, methods for forming a cured insulating layer on a printed wiring board using a resin composition such as a solder resist by using an ink jet printer are being diversely studied (Patent Document 1).

In the conventional methods, the resin composition was applied on a substrate by a screen printing method, a spray method, a curtain method, a dip coater method, a dry film method, etc., but these are all photo developing type methods which require complicated processes from printing or laminating at the onset to processes such as drying, exposing, developing, final curing and final UV curing.

When a cured layer is formed by an ink jet method, a process may be completed by printing via an ink jet and then performing final curing. Such an ink jet method may have advantages in not generating contaminating materials during an exposing process and a wet process such as a developing process.

However, in order to use the ink jet method, a resin composition used as ink is required to satisfy the physical properties of low viscosity, excellent pigment dispersibility, and storage stability, and at the same time, to have insulation reliability, surface strength, etc., which are required for conventional solder resist materials, and a method of preparing a resin composition for efficiently preparing the resin composition is required.

PRIOR ART DOCUMENT

Patent Document

Japanese Patent Laid-open No. Hei7-263845

SUMMARY OF THE INVENTION

The Problem to be Solved

The task to be solved by the present invention is to provide a method of efficiently preparing a resin composition which may be used in an ink jet method and satisfy physical properties such as low viscosity, good pigment dispersibility and storage stability, while satisfying insulation stability and surface strength, etc., which are required for the conventional solder resist material.

Means for Solving the Problem

In order to solve the above-described task, an aspect of the present invention provides a method of preparing an ink jet resin composition including preparing a liquid (a) including a thermosetting epoxy resin and a first non-volatile acryl compound, preparing a liquid (b) including a pigment and a second non-volatile acryl compound, preparing a liquid (c) including a photoinitiator and a third non-volatile acryl compound; and mixing the liquids (a), (b) and (c) and further including an amine synergist and a viscosity controlling agent to prepare a resin composition.

Advantageous Effect

According to the method of preparing an ink jet resin composition of the present invention, an ink jet resin composition may be easily prepared even not using a volatile solvent but using an acryl compound as a diluent, and the resin composition prepared thereby may improve the heat resistance, chemical resistance and adhesion of a cured resin layer formed by the composition.

DETAILED DESCRIPTION OF THE PREFERRED EMBODIMENT

Figure 1:
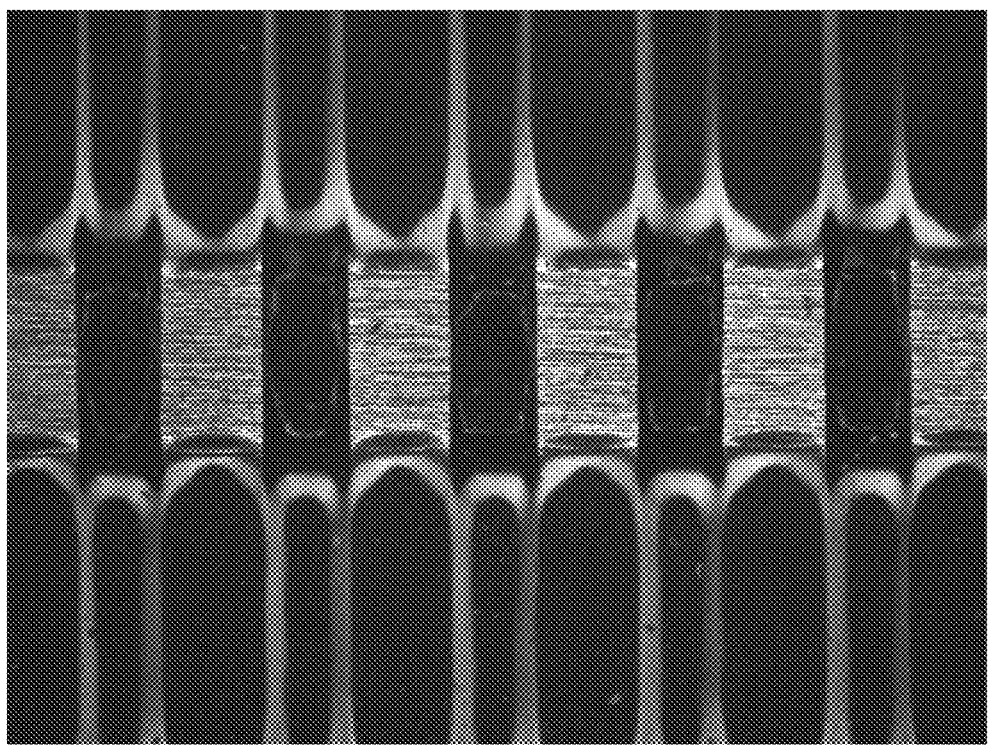
FIGS. 1 and 2 are photographic surface images of a sample for assessment according to Example 8.

Hereinafter, preferred embodiments of the present invention will be explained in detail. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, since the configuration of embodiments set forth in the present specification are shown by way of a preferred embodiment and do not represent all the technological spirit of the present invention, it should be understood that embodiments of the present invention may include various equivalents and alternatives at the time of the present application.

The method of preparing an ink jet resin composition according to an embodiment of the present invention may include preparing a liquid (a) including a thermosetting epoxy resin and a first non-volatile acryl compound, preparing a liquid (b) including a pigment and a second non-volatile acryl compound, preparing a liquid (c) including a photoinitiator and a third non-volatile acryl compound; and mixing the liquids (a), (b) and (c) and further including an amine synergist and a viscosity controlling agent to prepare a resin composition.

The preparation of the liquid (a) corresponds to a melting step of the thermosetting epoxy resin, and the thermosetting epoxy resin may melt in the first non-volatile acryl compound as a diluent without using a volatile solvent. 5 to 15 parts by weight of the thermosetting epoxy resin and 5 to 35 parts by weight of the first non-volatile acryl compound as a diluent may be included.

By including the thermosetting epoxy resin in the above range, adhesion of a cured resin layer obtained by curing a finally prepared resin composition to a substrate or a copper foil, or heat resistance of the cured resin layer may be secured. In addition, by employing the thermosetting epoxy resin in the resin composition used in the present invention, storage stability may be also secured.

The epoxy resin may have an epoxy equivalent weight (EEW) of 200 g/eq to 600 g/eq, or a weight average molecular weight of 1,000 to 5,000. If the epoxy equivalent weight is less than 100 g/eq, adhesion to a copper foil and heat resistance are not good, and if the epoxy equivalent weight is greater than 600 g/eq, storage stability is not good. If the weight average molecular weight is less than 1,000, adhesion to a copper foil and heat resistance are not good, and if the weight average molecular weight is greater than 5,000, discharging properties (Jeting Stability) from an ink jet head are not good due to high viscosity.

Conventionally, a resin having a low viscosity was used for easy discharging (jetting) of a composition from an ink jet head, but according to an embodiment of the present invention, even when an epoxy resin having high epoxy equivalent weight or high molecular weight is used, an ink jet resin composition may have a viscosity which enables easy discharging (jetting) from an ink jet head. Hereinafter, the viscosity indicates a measured viscosity according to JIS K2283.

Non-limiting examples of the epoxy resin may include at least one selected from the group consisting of a bisphenol A-type epoxy resin, a bisphenol F-type epoxy resin, a cresol novolak epoxy resin, a phenol novolak epoxy resin, halogen substituted products of the resins, alkynol substituted products of the resins, and hydrogenation products of the resins.

As a diluent, the first non-volatile acryl compound may include at least one monofunctional acrylate selected from the group consisting of isobornyl acrylate (IBOA), acryloyl morpholine (ACMO), trimethylolpropane formal acrylate (CTFA), and 2-phenoxyethyl acrylate (2PEA), and at least one bifunctional acrylate monomer selected from the group consisting of dipropylene glycol diacrylate (DPGDA) and 1,6-hexanediol diacrylate (HDDA).

The first non-volatile acryl compound as the diluent may use an acrylate monomer having a molecular weight of 1 to 1,000 and a viscosity of 1 to 50 cps (20-25° C.) in order to dilute the thermosetting epoxy resin. If the viscosity of the first non-volatile acryl compound is greater than 50 cps, the final viscosity as a resin composition ink used in an ink jet may increase, making the ink difficult to use. In addition, if the molecular weight increases, solubility may be decreased. Tg of the first non-volatile acryl compound may be at least 10° C. to 100° C. If the Tg is less than 10° C., heat resistance and chemical resistance required as a solder resist material may be weak, and if the Tg is greater than 100° C., the solubility with respect to the thermosetting epoxy resin may be decreased.

Here, the epoxy resin and the first non-volatile acryl compound may preferably be used in a weight ratio of 1:2 to 3 in consideration of easy melting of the epoxy resin.

In the preparation of the liquid (a), the epoxy resin may melt using the first non-volatile acryl compound and be mixed for 4 to 5 hours. The temperature during melting is dependent on a softening point of the epoxy resin used, and may be performed at a temperature of, for example, 50° C. to 100° C. In order to prevent the initiation of the thermal polymerization reaction of the epoxy resin at a high temperature during preparing the liquid (a), an inhibitor such as N-nitrophenyl hydroxylamine may be added as a polymerization inhibitor in an amount of 0.001 to 0.2 parts by weight based on 5 to 15 parts by weight of the thermosetting epoxy resin.

The preparation of the liquid (b) may be dispersing of the pigment in the second non-volatile acryl compound.

The pigment may be included as a combination of one kind of an organic pigment and one kind of an inorganic pigment. The pigment may include the inorganic pigment and the organic pigment in a weight ratio of 8 to 10:1.

The pigment may be included in an amount of 1 to 10 parts by weight, and the second non-volatile acryl compound may be included in an amount of 5 to 20 parts by weight.

If the amount is less than 1 part by weight of the pigment in a final resin composition, the implementation of color ((color stability) and hiding power may not be good, and if the amount is greater than 10 parts by weight, UV curing reactivity and storing stability may not be good.

Particular examples of the pigment that may be used may include, as inorganic pigments, at least one selected from the group consisting of $BaSO_4$, ZnO, ZnS, fumed silica, talc, $BiVO_4$ (Pigment yellow 184), cobalt blue, iron red, carbon black, and $TiO_2$, and as organic pigments, at least one selected from the group consisting of pigment blue (2), pigment blue (15:3), pigment yellow (74), and pigment yellow (83), pigment yellow (139), pigment yellow (150).

The second non-volatile acryl compound may include at least one monofunctional acrylate selected from the group consisting of isobornyl acrylate (IBOA), acryloyl morpholine (ACMO), trimethylolpropane formal acrylate (CTFA), and 2-phenoxyethyl acrylate (2PEA), and at least one bifunctional acrylate monomer selected from the group consisting of dipropylene glycol diacrylate (DPGDA) and 1,6-hexanediol diacrylate (HDDA).

In preparing the liquid (b), an acrylate monomer having a molecular weight of 1 to 1,000 and a viscosity of 1-50 cps (room temperature) may be used for the smooth dispersion of the pigment in the second non-volatile acryl compound. In the case where the viscosity of the second non-volatile compound is greater than 50 cps, the final viscosity as a resin composition ink used in an ink jet may increase, making the ink difficult to use. In addition, if the molecular weight increases, the dispersibility of the pigment may be decreased.

In the liquid (b), a dispersant such as Disperbyk111, Disperbyk2151, Disperbyk9150, Disperbyk9151 and Disperbyk 2152 may be included, and a polymerization inhibitor such as 4-methoxyphenyl (MEHQ) and butyrated hydroxyphenol (BHT) may be included alone or as a mixture.

The dispersing method of the pigment may be the conventionally well-known dispersing method. However, according to an embodiment of the present invention, the inorganic pigment and the organic pigment may be dispersed in the second non-volatile acryl compound at 3000 rpm or less using a mill base at a temperature of 10° C. to 40° C. for 0.5 to 2 hours at the same time or respectively. In particular, if the temperature is greater than 40° C., a thermal polymerization reaction may be performed by the high temperature, and dispersion stability may be rapidly deteriorated.

The preparation of the liquid (c) may be dissolving of the photoinitiator in the third non-volatile acryl compound. The photoinitiator may be included in an amount of 5 to 15 parts by weight, and the third non-volatile acryl compound may be included in an amount of 20 to 65 parts by weight.

The ink jet resin composition according to the present invention may be UV cured first during discharging (jetting) of the resin composition from an ink jet head. In order to perform a UV curing reaction, 5 to 15 parts by weight of a photoinitiator may be included in the resin composition. If the amount of the photoinitiator in the composition is less than 5 parts by weight, the UV curing may be insufficiently performed, and if the amount is greater than 15 parts by weight, the reactivity of a thermal curing reaction may decrease.

In particular, the photoinitiator may include at least one selected from the group consisting of an α-hydroxyketone-based compound, a benzyldimethyl-ketal-based compound, an α-aminoketone-based compound, a bis-acyl phosphine-based (BAPO) compound, and a mono acyl phosphine-based compound.

The liquid (c) may further include a photo auxiliary agent (photosensitizer), and the photo auxiliary agent may include at least one of a phosphine oxide-based compound or a thioxanthone-based compound.

The third non-volatile acryl compound may include at least one monofunctional acrylate selected from the group consisting of isobornyl acrylate (IBOA), acryloyl morpholine (ACMO), trimethylolpropane formal acrylate (CTFA), and 2-phenoxyethyl acrylate (2PEA), and at least one bifunctional acrylate monomer selected from the group consisting of dipropylene glycol diacrylate (DPGDA) and 1,6-hexanediol diacrylate (HDDA).

In the preparation of the liquid (c), the third non-volatile acryl compound may use an acrylate monomer having a molecular weight of 1 to 1,000 and a viscosity of 1 to 50 cps (room temperature). If the viscosity of the third non-volatile acryl compound is greater than 50 cps, the final viscosity as a resin composition ink used in an ink jet may increase, making the ink difficult to use. If the molecular weight increases, the solubility of the photoinitiator may be decreased.

In the preparation of the liquid (c), the photoinitiator may be dissolved and mixed in the third non-volatile acryl compound at a temperature of 30° C. to 70° C. for 0.5 to 2 hours. In order to prevent the initiation of a thermal polymerization reaction at a high temperature during preparing the liquid (c) a polymerization inhibitor such as 4-methoxyphenol (MEHQ) or butyrated hydroxyphenol (BHT) may be included alone or as a mixture.

According to an embodiment of the present invention, the liquids (a), (b) and (c) are prepared, the liquids (a), (b) and (c) thus prepared are mixed, and an amine synergist and a viscosity controlling agent may be additionally added during mixing to prepare a resin composition.

According to an embodiment of the present invention, the preparation of the resin composition may be performed by mixing the liquids (a), (b) and (c) with the amine synergist and the viscosity controlling agent at the temperature of 30° C. to 60° C.

In order to increase the curing rate and the viscosity control of a composition in which the thermosetting epoxy resin and the diluent are added, 1 to 10 parts by weight of a polyfunctional acrylate monomer may be included as a viscosity controlling agent based on 5 to 15 parts by weight of the thermosetting epoxy resin.

Particular examples of the polyfunctional acrylate monomer may be at least one selected from the group consisting of dipentaerythritol hexaacrylate (DPHA), pentaerythritol triacrylate (PETA), pentaerythritol tetraacrylate (PETRA), ditrimethylolpropane tetraacrylate (DiTMPTA), polyether tetraacrylate, polyester tetraacrylate, trimethylolpropane triacrylate (TMPTA), and tricyclodecane dimethanol diacrylate (TCDDA).

If the amount of the polyfunctional acrylate in the composition is less than 1 part by weight, sometimes the solvent resistance with respect to a substrate and UV curing reactivity of the resin composition, which are characteristics of the composition of the present invention, may not be obtained, and the amount is undesirable, and if the amount is greater than 10 parts by weight, ink components such as a pigment may be separated in the composition, and adhesion may be deteriorated due to contraction (shrinkage) after a curing reaction, and thus, the amount is undesirable.

In particular, the amine synergist may be included in the resin composition and may play the role of collecting (trapping) oxygen in the air to minimize the above-described oxygen hindrance (inhibition) phenomenon, and an easier polymerization initiation reaction may be promoted. The amine synergist in the resin composition may be included in an amount of 1 to 10 parts by weight based on 5 to 15 parts by weight of the thermosetting epoxy resin.

The amine synergist may be an acrylate including two to five tertiary amine structures as functional groups in a molecule for the oxygen collection and easy production of radicals by UV rays. In particular, the amine synergist may use at least one selected from the group consisting of a compound represented by the following Formula 1, bis-N, N-[(4-dimethylaminobenzoyl) oxiethylen-1-yl]-methylamine, MIRAMER AS2010 (Miwon Commercial Co., Ltd.), and MIRAMER AS5142 (Miwon Commercial Co., Ltd.) or derivative thereof.

[Formula 1]

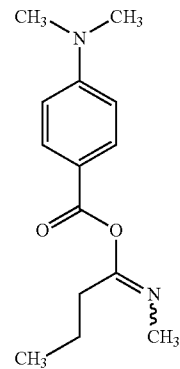

In addition, the resin composition according to an embodiment of the present invention may further include additives such as a well known polymerization inhibitor such as hydroquinone, hydroquinone monomethyl ether, tert-butylcatechol, pyrogallol and phenothiazine, a defoamer and/or leveling agent such as silicon-based, fluorine-based, and polymer-based agents, and adhesion imparting agent such as imidazole-based, thiazole-based and triazole-based adhesion imparting agents and a silane coupling agent.

After preparing the resin composition, an inspection process for inspecting the final viscosity, particle size, surface tension and specific gravity of the composition, and for inspecting a cured coating layer may be further included, and after conducting the inspection process, a filtering process may be further included in the preparation of the resin composition, in which the filtering of the resin composition may be performed using a filter for filtering particles having an average particle size greater than 1 μm.

EXAMPLES

Hereinafter, embodiments on the ink jet resin composition according to an aspect of the present invention will be described and the present invention will be explained in particular. However, the present invention is not limited to the following embodiments. In addition, the term "parts" means parts by weight, unless specifically noted below.

Examples 1-4 and Comparative Examples 1-4

<Preparation of Liquid (a)>

An epoxy resin melted in a diluent using the components and amounts illustrated in Tables 1 to 4 at 90 to 95° C. for 3 hours using a glass beaker and a hot plate. The liquid thus obtained was regarded as liquid 1.

<Preparation of Liquid (b)>

An inorganic pigment and an organic pigment were dispersed in a diluent using the components and amounts illustrated in Tables 1 to 4 at 40° C. for 60 to 120 minutes using a dispersion chamber, and the water temperature of cooling water was kept to 10° C. so that the temperature did not exceed 40° C. A pigment dispersion having a particle size distribution of 0.30 μm ($D_{50}$: average particle size) was obtained, and the liquid thus obtained was regarded as liquid 2.

<Preparation of Liquid (c)>

A photoinitiator melted in a diluent using the components and amounts illustrated in Tables 1 to 4 at 45° C. to 50° C. for 30 to 60 minutes using a beaker and a hot plate. The liquid thus obtained was regarded as liquid 3.

<Preparation of Resin Composition>

The liquids 1 to 3 thus prepared and the remaining components illustrated in Tables 1 to 4 were mixed, and stirring was performed using a stirrer at 300 to 500 rpm at room temperature for 30 to 60 minutes to prepare a resin composition.

<Filtering>

The resin composition thus prepared was filtered using a membrane filter having an average pore diameter of 1 μm, TECHFLOW, manufactured Chungsoo Technofil Co., Ltd.

<Compounds>

Liquid BPA: a bisphenol A-type epoxy resin having an epoxy equivalent weight of 185 g/eq Solid BPF: a bisphenol F-type epoxy resin having an epoxy equivalent weight of 500 g/eq ECN: a cresol novolak epoxy resin having an epoxy equivalent weight of 220 g/eq ACMO: acryolyl morpholine
CTFA: trimethylolpropane formal acrylate
IBOA: isobornyl acrylate
DPGDA: dipropylene glycol diacrylate
TMPTA: trimethylolpropane triacrylate
BAPO: bis(2,4,6-trimethylbenzoyl)-phenylphosphine oxide
DETX: 2,4-diethyl thioxanthone
DPHA: dipentaerythritol hexaacrylate
BHT: butyrated hydroxyphenol
NPHA: N-nitrophenyl hydroxylamine
Amine synergist: a compound of Formula 1

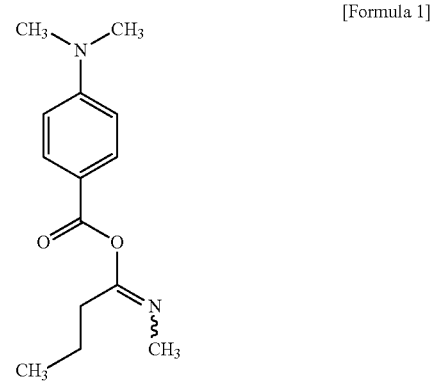

[Formula 1]

AS2010: manufactured by Miwon Commercial Co., Ltd.
DISPERBYK111: manufactured by BYK-Chemie GmbH Co., Ltd.

TABLE 1

| | | | Example 1 | | | | Example 2 | | | |
|---|---|---|---|---|---|---|---|---|---|---|
| | Component | | Total | Liquid 1 | Liquid 2 | Liquid 3 | Total | Liquid 1 | Liquid 2 | Liquid 3 |
| Thermosetting resin | Epoxy resin | Solid BPA | | | | | | | | |
| | | Liquid BPA | | | | | | | | |
| | | Solid BPF | | | | | | | | |
| | | ECN | 10 | 10 | | | 10 | 10 | | |
| Diluent | Monofunctional | ACMO | 20 | | | 20 | 20 | | | 20 |
| | | CTFA | 30 | 10 | 5 | 15 | 30 | 10 | 5 | 15 |
| | | IBOA | 10 | | | 10 | 10 | | | 10 |
| | Bifunctional | DPGDA | 25 | 10 | 5 | 10 | 25 | 10 | 5 | 10 |
| Viscosity controlling agent | Trifunctional | TMPTA | 5 | | | | | | | |
| | Tetrafunctional | Polyether tetraacrylate | | | | | 5 | | | |
| Photoinitiator and photo auxiliary agent | | BAPO | 3 | | | 3 | 3 | | | 3 |
| | | DETX | 2 | | | 2 | 2 | | | 2 |
| Dispersant | | DISPERBYK111 | 1 | | 1 | | 1 | | 1 | |
| Amine synergist | | Formula 1 | 4 | | | | 4 | | | |
| Pigment | | Pigment Yellow 184 | 5 | | 5 | | 5 | | 5 | |
| | | Pigment Blue 15:3 | 0.5 | | 0.5 | | 0.5 | | 0.5 | |
| Thermal curing agent | | Blocked isocyanate | | | | | | | | |
| | Parts by weight | | 115.5 | 30 | 16.5 | 60 | 115.5 | 30 | 16.5 | 60 |

TABLE 2

| Component | | | Example 3 | | | | Example 4 | | | |
|---|---|---|---|---|---|---|---|---|---|---|
| | | | Total | Liquid 1 | Liquid 2 | Liquid 3 | Total | Liquid 1 | Liquid 2 | Liquid 3 |
| Thermosetting resin | Epoxy resin | Solid BPA | | | | | | | | |
| | | Liquid BPA | | | | | 10 | 10 | | |
| | | Solid BPF | 10 | 10 | | | | | | |
| | | ECN | | | | | | | | |
| Diluent | Monofunctional | ACMO | 20 | | | 20 | 20 | | | 20 |
| | | CTFA | 30 | 10 | 5 | 15 | 20 | | 5 | 15 |
| | | IBOA | 10 | | | 10 | 10 | | | 10 |
| | Bifunctional | DPGDA | 25 | 10 | 5 | 10 | 15 | | 5 | 10 |
| Viscosity controlling agent | Trifunctional | TMPTA | | | | | | | | |
| | Tetrafunctional | Polyether tetraacrylate | 5 | | | | 5 | | | |
| Photoinitiator and photo auxiliary agent | | BAPO | 3 | | | 3 | 3 | | | 3 |
| | | DETX | 2 | | | 2 | 2 | | | 2 |
| Dispersant | | DISPERBYK111 | 1 | | 1 | | 1 | | 1 | |
| Amine synergist | | Formula 1 | 4 | | | | 4 | | | |
| Pigment | | Pigment Yellow 184 | 5 | | 5 | | 5 | | 5 | |
| | | Pigment Blue 15:3 | 0.5 | | 0.5 | | 0.5 | | 0.5 | |
| Thermal curing agent | | Blocked isocyanate | | | | | | | | |
| | | Parts by weight | 115.5 | 30 | 16.5 | 60 | 95.5 | 10 | 16.5 | 60 |

TABLE 3

| Component | | | Comparative Example 1 | | | | Comparative Example 2 | | | |
|---|---|---|---|---|---|---|---|---|---|---|
| | | | Total | Liquid 1 | Liquid 2 | Liquid 3 | Total | Liquid 1 | Liquid 2 | Liquid 3 |
| Thermosetting resin | Epoxy resin | Solid BPA | | | | | | | | |
| | | Liquid BPA | 10 | 10 | | | | | | |
| | | Solid BPF | | | | | 10 | 10 | | |
| | | ECN | | | | | | | | |
| Diluent | Monofunctional | ACMO | 20 | | | 20 | 20 | | | 20 |
| | | CTFA | 20 | | 5 | 15 | 30 | 10 | 5 | 15 |
| | | IBOA | 10 | | | 10 | 10 | | | 10 |
| | Bifunctional | DPGDA | 15 | | 5 | 10 | 25 | 10 | 5 | 10 |
| Viscosity controlling agent | Trifunctional | TMPTA | 5 | | | | 5 | | | |
| | Tetrafunctional | Polyether tetraacrylate | | | | | | | | |
| Photoinitiator and photo auxiliary agent | | BAPO | 3 | | | 3 | 3 | | | 3 |
| | | DETX | 2 | | | 2 | 2 | | | 2 |
| Dispersant | | DISPERBYK111 | 1 | | 1 | | 1 | | 1 | |
| Amine synergist | | Formula 1 | 4 | | | | 4 | | | |
| Pigment | | Pigment Yellow (184) | 5 | | 5 | | 5 | | 5 | |
| | | Pigment Blue (15:3) | 0.5 | | 0.5 | | 0.5 | | 0.5 | |
| Thermal curing agent | | Blocked isocyanate | 1 | | | | 1 | | | |
| Total | | Parts by weight | 96.5 | 10 | 16.5 | 60 | 116.5 | 30 | 16.5 | 60 |

TABLE 4

| Component | | | Comparative Example 3 | | | | Comparative Example 4 | | | |
|---|---|---|---|---|---|---|---|---|---|---|
| | | | Total | Liquid 1 | Liquid 2 | Liquid 3 | Total | Liquid 1 | Liquid 2 | Liquid 3 |
| Thermosetting resin | Epoxy resin | Solid BPA | | | | | | | | |
| | | Liquid BPA | | | | | | | | |
| | | Solid BPF | | | | | | | | |
| | | ECN | 10 | 10 | | | 10 | 10 | | |
| Diluent | Monofunctional | ACMO | 20 | | | 20 | 20 | | | 20 |
| | | CTFA | 30 | 10 | 5 | 15 | 30 | 10 | 5 | 15 |
| | | IBOA | 10 | | | 10 | 10 | | | 10 |

TABLE 4-continued

|  |  |  | Comparative Example 3 | | | | Comparative Example 4 | | | |
|---|---|---|---|---|---|---|---|---|---|---|
| | Component | | Total | Liquid 1 | Liquid 2 | Liquid 3 | Total | Liquid 1 | Liquid 2 | Liquid 3 |
| Viscosity controlling agent | Bifunctional | DPGDA | 25 | 10 | 5 | 10 | 25 | 10 | 5 | 15 |
| | Trifunctional | TMPTA | 5 | | | | | | | |
| | Tetrafunctional | Polyether tetraacrylate | | | | | 5 | | | |
| Photoinitiator and photo auxiliary agent | | BAPO | 3 | | | 3 | 3 | | | 3 |
| | | DETX | 2 | | | 2 | 2 | | | 2 |
| Dispersant | | DISPERBYK111 | 1 | | 1 | | 1 | | 1 | |
| Amine synergist | | Formula 1 | 4 | | | | 4 | | | |
| Pigment | | Pigment Yellow (184) | 5 | | 5 | | 5 | | 5 | |
| | | Pigment Blue (15:3) | 0.5 | | 0.5 | | 0.5 | | 0.5 | |
| Thermal curing agent | | Blocked isocyanate | 1 | | | | 1 | | | |
| Total | | Parts by weight | 116.5 | 30 | 16.5 | 60 | 116.5 | 30 | 16.5 | 60 |

[Assessment]

Each of the resin compositions prepared in Examples 1 to 4 and Comparative Examples 1 to 4 was coated on a copper foil using an ink jet, exposed to light with a light intensity of 200 mJ/cm² for pre-curing, and thermally cured at 150° C. for 60 minutes using a hot air circulation(convection)-type dryer to form a cured resin layer to obtain a sample for assessment.

(1) Surface State

The coated layer thus formed was observed with the naked eye, and the results were assessed with the numeral 5 when a smooth and uniform surface was formed and 1 when a sticky (uncured material) and liquid remaining surface was formed.

(2) Adhesion

With respect to a copper foil on which a cured resin layer was formed, adhesion between the copper foil and the resin layer was evaluated based on IPC-TM-650 2.4.1.6.

(3) Pencil Hardness

The pencil hardness of a cured resin layer of a sample for assessment was measured based on ASTM D3363.

TABLE 5

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Surface state (200 mJ/cm²) | 5 | 5 | 5 | 5 | 5 | 5 | 5 | 5 |
| Adhesion | 5 | 5 | 5 | 5 | 1 | 2-3 | 5 | 5 |
| Pencil hardness | 4H | 4H | 4H | 4H | H | 4H | 4H | 4H |

As shown in Table 5, the resin compositions according to example embodiments of the present invention were secured to have good properties of the overall surface state, the adhesion and the pencil hardness.

Examples 5-7 and Comparative Examples 5-6

Resin compositions were prepared by the same method described in Example 1 with the components and amounts illustrated in Tables to 8.

TABLE 6

|  |  |  | Example 5 | | | | Example 6 | | | |
|---|---|---|---|---|---|---|---|---|---|---|
| | Component | | Total | Liquid 1 | Liquid 2 | Liquid 3 | Total | Liquid 1 | Liquid 2 | Liquid 3 |
| Thermosetting resin | Epoxy resin | ECN | 10 | 10 | | | 5 | 5 | | |
| Diluent | Monofunctional | ACMO | 20 | | | 20 | 20 | | | 20 |
| | | CTFA | 30 | 10 | 5 | 15 | 25 | 5 | 5 | 15 |
| | | IBOA | 10 | | | 10 | 10 | | | 10 |
| | Bifunctional | DPGDA | 25 | 10 | 5 | 10 | 20 | 5 | 5 | 10 |
| Viscosity controlling agent | Tetrafunctional | Polyether tetraacrylate | 3 | | | | 3 | | | |
| | Hexafunctional | DPHA | 3 | | | | 3 | | | |
| Photoinitiator and photo auxiliary agent | | BAPO | 3 | | | 3 | 3 | | | 3 |
| | | DETX | 2 | | | 2 | 2 | | | 2 |

TABLE 6-continued

| Component | | | Example 5 | | | | Example 6 | | | |
|---|---|---|---|---|---|---|---|---|---|---|
| | | | Total | Liquid 1 | Liquid 2 | Liquid 3 | Total | Liquid 1 | Liquid 2 | Liquid 3 |
| Dispersant | | DISPERBYK111 | 1 | | 1 | | 1 | | 1 | |
| Amine synergist | | Formula 1 | 5 | | | | 5 | | | |
| Pigment | | Pigment Yellow (184) | 5 | | 5 | | 5 | | 5 | |
| | | Pigment Blue (15:3) | 0.5 | | 0.5 | | 0.5 | | 0.5 | |
| Polymerization inhibitor | | NPHA | 0.001 | 0.001 | | | 0.001 | 0.001 | | |
| | | BHT | 0.501 | | 0.001 | 0.5 | 0.501 | | 0.001 | 0.5 |
| | | Parts by weight | 118.002 | 30.001 | 16.501 | 60.5 | 103.002 | 15.001 | 16.501 | 60.5 |

TABLE 7

| Component | | | Example 7 | | | | Comparative Example 5 | | | |
|---|---|---|---|---|---|---|---|---|---|---|
| | | | Total | Liquid 1 | Liquid 2 | Liquid 3 | Total | Liquid 1 | Liquid 2 | Liquid 3 |
| Thermosetting resin | Epoxy resin | ECN | 10 | 10 | | | 3.3 | 3.3 | | |
| Diluent | Monofunctional | ACMO | 20 | | | 20 | 20 | | | 20 |
| | | CTFA | 30 | 10 | 5 | 15 | 23.4 | 3.4 | 5 | 15 |
| | | IBOA | 10 | | | 10 | 10 | | | 10 |
| | Bifunctional | DPGDA | 25 | 10 | 5 | 10 | 18.3 | 3.3 | 5 | 10 |
| Viscosity controlling agent | Tetrafunctional | Polyether tetraacrylate | 3 | | | | 3 | | | |
| | Hexafunctional | DPHA | 3 | | | | 3 | | | |
| Photoinitiator and photo auxiliary agent | | BAPO | 3 | | | 3 | 3 | | | 3 |
| | | DETX | 2 | | | 2 | 2 | | | 2 |
| Dispersant | | DISPERBYK111 | 1 | | 1 | | 1 | | 1 | |
| Amine synergist | | Formula 1 | | | | | 5 | | | |
| | | AS2010 (liquid phase) | 5 | | | | | | | |
| Pigment | | Pigment Yellow (184) | 5 | | 5 | | 5 | | 5 | |
| | | Pigment Blue (15:3) | 0.5 | | 0.5 | | 0.5 | | 0.5 | |
| Polymerization inhibitor | | NPHA | 0.001 | | | | 0.001 | 0.001 | | |
| | | BHT | 0.501 | | 0.001 | 0.5 | 0.501 | | 0.001 | 0.5 |
| | | Parts by weight | 118.002 | 30.001 | 16.501 | 60.5 | 97.002 | 10.001 | 16.501 | 60.5 |

TABLE 8

| Component | | | Comparative Example 6 | | | |
|---|---|---|---|---|---|---|
| | | | Total | Liquid 1 | Liquid 2 | Liquid 3 |
| Thermosetting resin | Epoxy resin | ECN | 23 | 20 | | |
| Diluent | Monofunctional | ACMO | 20 | | | 20 |
| | | CTFA | 30 | 10 | 5 | 15 |
| | | IBOA | 10 | | | 10 |
| | Bifunctional | DPGDA | 25 | 10 | 5 | 10 |
| Viscosity controlling agent | Tetrafunctional | Polyether tetraacrylate | 3 | | | |
| | Hexafunctional | DPHA | 3 | | | |
| Photoinitiator and photo auxiliary agent | | BAPO | 3 | | | 3 |
| | | DETX | 2 | | | 2 |
| Dispersant | | DISPERBYK111 | 1 | | 1 | |
| Amine synergist | | Formula 1 | 5 | | | |
| Pigment | | Pigment Yellow (184) | 5 | | 5 | |
| | | Pigment Blue (15:3) | 0.5 | | 0.5 | |
| Polymerization inhibitor | | NPHA | 0.001 | 0.001 | | |
| | | BHT | 0.501 | | 0.001 | 0.5 |
| | | Parts by weight | 128.002 | 40.001 | 16.501 | 60.5 |

[Assessment]

Each of the resin compositions prepared in Examples 5 to 7 and Comparative Examples 5 to 6 was coated on a copper foil using an ink jet, and exposed to light with a light intensity of 150 mJ/cm² at 385 nm using an LED lamp for pre-curing, and thermally cured at 150° C. for 60 minutes using a hot air circulation (convection)-type dryer to form a cured resin layer to obtain a sample for assessment.

(1) Adhesion

With respect to a copper foil on which a cured resin layer was formed, adhesion between the copper foil and the resin layer was evaluated based on IPC-TM-650 2.4.1.6.

(2) Pencil Hardness

The pencil hardness of a cured resin layer of a sample for assessment was measured based on ASTM D3363.

(3) Heat Resistance

After leaving a sample for assessment at 288° C. for 10 seconds, the sample was cooled to room temperature. This process was repeated three times. The deformation of the cured resin layer formed on the sample for assessment was observed with the naked eye for each repetition, and the results were assessed as O when no deformation (Crack or delamination) occurred, and X when deformation occurred.

(4) Solvent Resistance

A piece of cloth was wet with propylene glycol monomethyl ether acetate, and a cured resin layer was repeatedly rubbed with the cloth ten times. A case where the cloth was stained with the dissolved portion of the cured resin layer was regarded as poor.

TABLE 9

| | Example 5 | Example 6 | Example 7 | Comparative Example 5 | Comparative Example 6 |
|---|---|---|---|---|---|
| UV curability (150 mJ/cm²) | OK | OK | OK | OK | * Unmeasurable: has high viscosity, and is not discharged from ink jet head |
| Adhesion | 5 | 5 | 5 | 5 | |
| Pencil hardness | 5H | 5H | 5H | 5H | |
| Heat resistance | Three times pass | Three times pass | Three times pass | Three times pass | |
| Solvent resistance | Pass | Pass | Pass | Pass | |
| Plating resistance | OK | OK | OK | NG | |

As shown in the above table, the resin compositions which deviate from the content range of the thermosetting resin of the present disclosure according to Comparative Examples 5 and 6 were found to be difficult in securing desired physical properties of a resin composition.

Example 8 and Comparative Example 6

Resin compositions were prepared by the same method described in Example 1 and using the components and amounts illustrated in Table 10. In Comparative Example 6, the pigment was a combination of two kinds of organic pigments, Pigment yellow 150 and Pigment Blue (15:3).

TABLE 10

| Component | | | Example 8 | | | Comparative Example 6 | | | |
|---|---|---|---|---|---|---|---|---|---|
| | | | Total | Liquid 1 | Liquid 2 | Liquid 3 | Total | Liquid 1 | Liquid 2 | Liquid 3 |
| Thermosetting resin | Epoxy resin | ECN | 10 | 10 | | | 5 | 5 | | |
| Diluent | Monofunctional | ACMO | 20 | | | 20 | 20 | | | 20 |
| | | CTFA | 30 | 10 | 5 | 15 | 25 | 5 | 5 | 15 |
| | | IBOA | 10 | | | 10 | 10 | | | 10 |
| | Bifunctional | DPGDA | 25 | 10 | 5 | 10 | 20 | 5 | 5 | 10 |
| Viscosity controlling agent | Tetrafunctional | Polyether tetraacrylate | 5 | | | | 5 | | | |
| Photoinitiator and photo auxiliary agent | | BAPO | 3 | | | 3 | 3 | | | 3 |
| | | DETX | 2 | | | 2 | 2 | | | 2 |
| | | DISPERBYK111 | 1 | | 1 | | 1 | | 1 | |
| Amine synergist | | Formula 1 | 4 | | | | 4 | | | |
| Pigment | | Pigment Yellow (184) | 5 | | 5 | | | | | |
| | | Pigment Yellow (150) | | | | | 0.5 | | 0.5 | |
| | | Pigment Blue (15:3) | 0.5 | | 0.5 | | 0.5 | | 0.5 | |
| | | Parts by weight | 115.5 | 30 | 16.5 | 60 | 96 | 15 | 11.5 | 60 |

(5) Plating Resistance

Experiments on electroless nickel/immersion gold plating (ENIG) properties on the cured resin layers thus manufactured in the examples and the comparative examples were conducted, and liquid permeation or exfoliation after the electroless nickel/immersion gold plating was observed with the naked eye. As a result, after the electroless nickel/immersion gold plating, a case where no liquid permeation or exfoliation (expansion or delamination) was observed with the naked eye was regarded as "OK", and a case where liquid permeation or exfoliation (expansion or delamination) was observed with the naked eye was regarded as "NG".

[Assessment]

Figure 2:
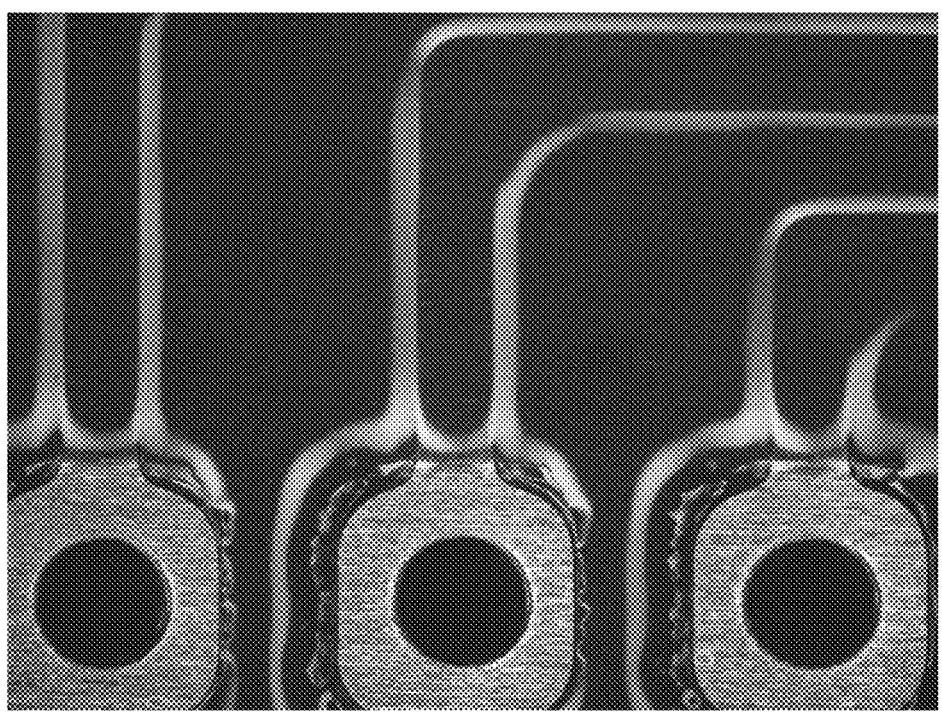

Each of the resin compositions prepared in Example 8 and Comparative Example 6 was coated on a substrate (PCB) on which a copper foil was formed using an ink jet, exposed to light with a light intensity of 200 mJ/cm² to pre-cure, and thermally cured at 150° C. for 60 minutes using a hot air circulation (convection)-type dryer to form a cured resin layer to obtain a sample for assessment. Then, the surface pictures of the sample were taken, and the results are shown in FIGS. 1 and 2 for the surface of Example 8, and FIGS. 3 and 4 for the surface of Comparative Example 6.

Figure 3:
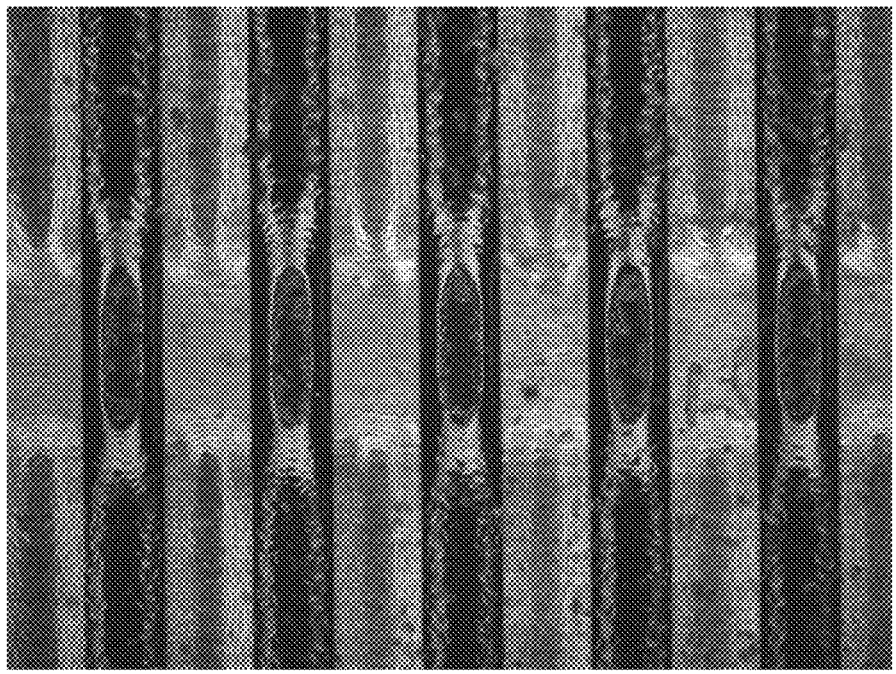
FIGS. 3 and 4 are photographic surface images of a sample for assessment according to Comparative Example 6.
Figure 4:
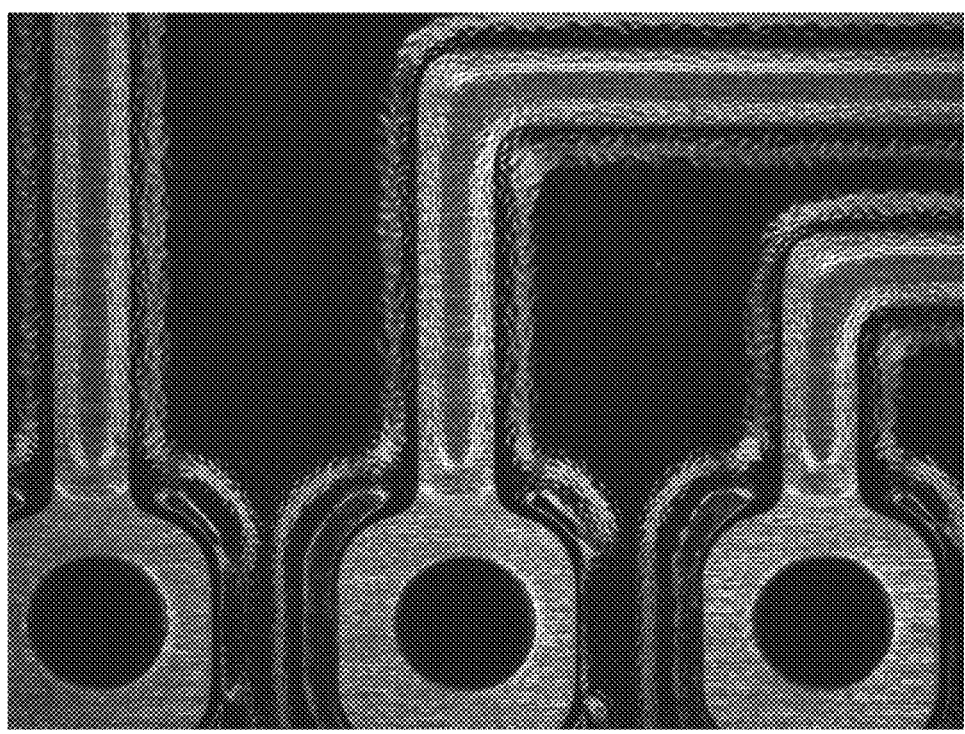

When a combination of only organic pigments was used, hiding power was deteriorated, and the scratches of a copper foil on a base substrate were seen therethrough as shown in FIG. 3, but when a combination of an organic pigment and an inorganic pigment was used according to an embodiment of the present invention, the scratches of a copper foil on a base substrate were not seen, and a good surface state was secured.

What is claimed is:

1. A method of preparing an ink jet resin composition, the method comprising:
    preparing a liquid (a) comprising a thermosetting epoxy resin and a first non-volatile acryl compound, wherein the thermosetting epoxy resin has an epoxy equivalent weight of 200 g/eq to 600 g/eq;
    preparing a liquid (b) comprising a pigment and a second non-volatile acryl compound;
    preparing a liquid (c) comprising a photoinitiator and a third non-volatile acryl compound; and
    mixing the liquids (a), (b) and (c) and further comprising an amine synergist and a viscosity controlling agent to prepare a resin composition.

2. The method of preparing an ink jet resin composition of claim 1, wherein the liquid (a) is prepared by comprising 5 to 15 parts by weight of the thermosetting epoxy resin, and 10 to 35 parts by weight of the first non-volatile acryl compound.

3. The method of preparing an ink jet composition of claim 1, wherein the liquid (b) is prepared by comprising 1 to 10 parts by weight of the pigment, and 5 to 20 parts by weight of the second non-volatile acryl compound.

4. The method of preparing an ink jet resin composition of claim 1, wherein the liquid (c) is prepared by comprising 5 to 15 parts by weight of the photoinitiator, and 20 to 65 parts by weight of the third non-volatile acryl compound.

5. The method of preparing an ink jet resin composition of claim 1, wherein the first, second and third non-volatile acryl compounds comprise a monofunctional or bifunctional acrylate monomer.

6. The method of preparing an ink jet resin composition of claim 1, wherein the first, second and third non-volatile acryl compounds have a molecular weight of 10 to 1,000 and a viscosity of 1 to 50 cps.

7. The method of preparing an ink jet resin composition of claim 1, wherein the pigment comprises an inorganic pigment and an organic pigment in a weight ratio of 8 to 10:1.

8. The method of preparing an ink jet resin composition of claim 1, wherein the liquid (c) further comprises a photo auxiliary agent (photosensitizer) comprising at least one of a phosphine oxide-based compound or a thioxanthone-based compound.

9. The method of preparing an ink jet resin composition of claim 1, wherein the liquid (a) is prepared by performing mixing at a temperature range of 50° C. to 100° C. for 4 to 5 hours.

10. The method of preparing an ink jet resin composition of claim 1, wherein the liquid (b) further comprises a dispersant, and the pigment is dispersed in the second non-volatile acryl compound at a temperature range of 10° C. to 40° C. for 0.5 to 2 hours.

11. The method of preparing an ink jet resin composition of claim 1, wherein the liquid (c) is prepared by performing mixing at a temperature range of 30° C. to 70° C. for 0.5 to 2 hours.

12. The method of preparing an ink jet resin composition of claim 1, wherein the viscosity controlling agent comprises at least one polyfunctional acrylate monomer selected from the group consisting of dipentaerythritol hexaacrylate (DPHA), pentaerythritol triacrylate (PETA), pentaerythritol tetraacrylate (PETRA), ditrimethylolpropane tetraacrylate (DiTMPTA), polyether tetraacrylate, polyester tetraacrylate, trimethylolpropane triacrylate (TMPTA), and tricyclodecane dimethanol diacrylate (TCDDA).

13. The method of preparing an ink jet resin composition of claim 1, wherein the amine synergist is an acrylate comprising two to five tertiary amine structures in a molecule.

14. The method of claim 13, wherein the amine synergist comprises at least one selected from the group consisting of a compound represented by the following Formula 1, bis-N,N-[(4-dimethylaminobenzoyl)oxiethylen-1-yl]-methylamine, derivative thereof:

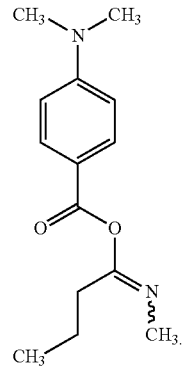

[Formula 1]

15. The method of preparing an ink jet resin composition of claim 1, further comprising a filtering process, and the filtering of the resin composition is performed by filtering particles having an average particle size greater than 1 μm.

* * * * *